July 31, 1962  W. SASSMANNSHAUSEN ETAL  3,047,034
FEEDING DEVICE FOR PLASTIC MATERIAL, ESPECIALLY
EXPLOSIVES FOR USE IN CONNECTION
WITH PACKING MACHINES
Filed June 23, 1960  2 Sheets-Sheet 1
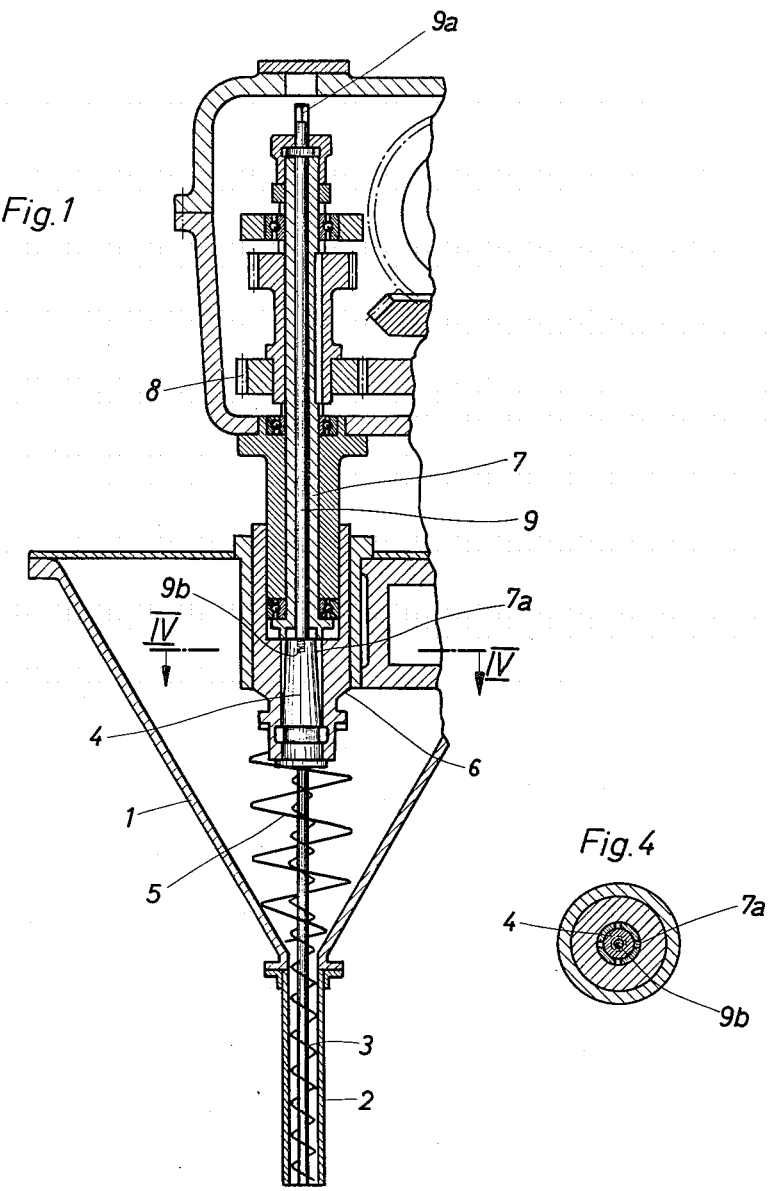
INVENTORS
Werner Sassmannshausen
Otto Niepmann
BY
Patent Agent.

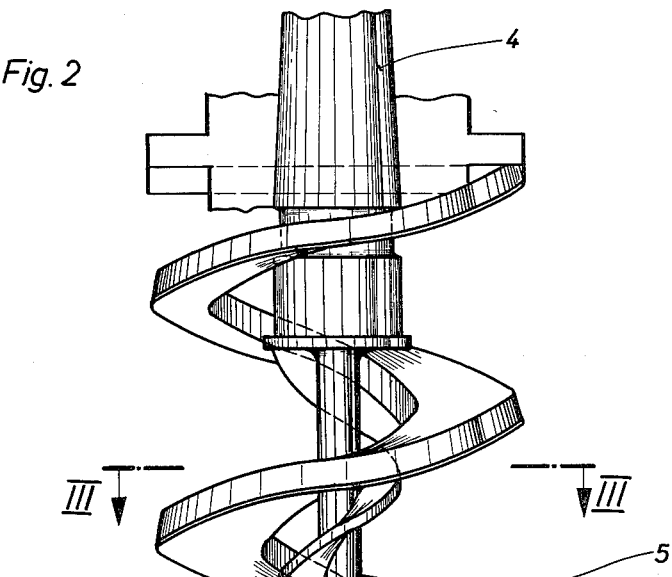
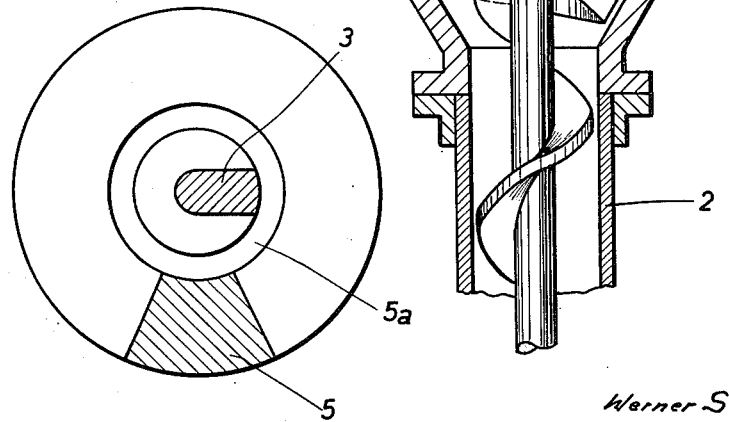

United States Patent Office 3,047,034
Patented July 31, 1962

3,047,034
FEEDING DEVICE FOR PLASTIC MATERIAL, ESPECIALLY EXPLOSIVES FOR USE IN CONNECTION WITH PACKING MACHINES
Werner Sassmannshausen, Leverkusen-Schleebusch, and Otto Niepmann, Gevelsberg, Westphalia, Germany, assignors to Maschinenfabrik Fr. Niepmann & Co., Gevelsberg, Westphalia, Germany
Filed June 23, 1960, Ser. No. 38,372
Claims priority, application Germany July 6, 1959
4 Claims. (Cl. 141—311)

The present invention relates to feeding means for plastic masses, especially explosives for use in connection with packing machines. With packing machines for filling plastic masses, for instance explosives, into containers or cartridges, it is known to arrange a worm in a storage container and to cause said worm to feed the mass into a hollow mandrel over which the container or cartridge to be filled is slipped. However, experience has shown that when employing simple or ordinary worms, the quantity of explosives being fed is not always uniform so that the filling of the container or cartridge will vary for the respective containers or cartridges. This represents a particular drawback when employing multi-spindle packing machines in which the filling of all cartridges being produced at the same time must be the same.

It is, therefore, an object of the present invention to provide a packing machine of the above mentioned type which will overcome the drawback set forth above.

It is another object of this invention to provide a feeding device for plastic material, especially explosives, for use in connection with packing machines, which will make it possible to adjust the feeding worms relative to each other without removal of the filling hopper or other machine elements, in such a way as to assure uniform filling of the containers or cartridges being filled at the same time.

These and other objects and advantages of the invention will appear more clearly from the following specification in connection with the accompanying drawings, in which:

FIG. 1 illustrates a longitudinal section through a feeding arrangement according to the present invention.

FIG. 2 illustrates a view of the two worms employed in the arrangement of FIG. 1, but on a larger scale than that of FIG. 1.

FIG. 3 is a cross section taken along the line III—III of FIG. 2.

The feeding arrangement according to the present invention is characterized primarily in that in the storage container or reservoir for the material to be fed there is provided a feeder worm which extends around the filling worm portion in said reservoir in spaced relationship to said filling worm so that an annular chamber will be confined by and between said worms. Furthermore, means are provided for adjusting the said two worms relative to each other. The said additional feeder worm will press the material to be packed into the windings of the filler worm so that the latter will always remain uniformly filled. Due to the adjustability of the two worms relative to each other, it will be assured that with multi-spindle arrangements, the respective containers or cartridges will always be uniformly filled.

According to a design which has proved particularly successful in practice, the filler worm is connected to a spindle provided with a clamping cone. The spindle passes through a hollow drive shaft so that the worms can be adjusted relative to each other without the necessity of removing the filling hopper or other machine elements.

Referring now to the drawings in detail, the hopper 1 is provided in a manner known per se with a filling mandrel 2 over which the container or cartridge to be filled, for instance with explosive, is to be slipped. The filling worm 3 extends into said filling mandrel and has its upper end provided with a clamping cone 4. Arranged around the filling worm 3 within the hopper or filling cylinder 1 is a further feeding worm 5 provided with a bushing 6. The said worm 5 always feeds sufficient material to be fed to the filling worm 3 so that a uniform filling of the containers or cartridges to be filled will be assured.

The excess material fed by the feeder worm 5 is permitted to rise in the hopper 1 laterally of said worm 5 and through the annular chamber 5a between the two worms 3 and 5 (see FIG. 3).

The drive of the worms is effected through the intervention of a hollow shaft 7 which latter through a gear 8 is drivingly connected to a prime mover (not shown in the drawing). Arranged in the interior of shaft 7 is a spindle 9 adapted to be rotated by means of a square head 9a. Spindle 9 is connected to cone 4 by means of a thread 9b. The lower end of shaft 7 is provided with a slotted inner cone 7a. When spindle 9 is actuated, cone 4 is drawn into the inner cone 7a whereby the shaft 7 will be coupled to worm 3, and also to worm 5 through bushing 6.

The separate arrangement of the worms 3 and 5, which has the advantage of permitting the two worms to be adjusted relative to each other, are connected through clamping cone 4 and slotted inner cone member 7a which is selectively engageable with clamping cone 4. During operation of the feeding system, clamping cone 4, inner cone 7a, and bushing 6 are fixedly connected with each other. In order to effect an adjustment of worms 3 and 5, the clamping cone, inner cone and bushing must be disconnected. This disconnection is effected by means of spindle 9. The latter is grasped at its head 9a by a suitable tool and rotated sufficiently to unscrew threaded stud 9b. Inasmuch as spindle 9 is restrained by an annular cellar adjacent to its head, it cannot move in a vertical direction, whereby the effect of rotating threaded stud 9b in the proper direction is to drop cone 4 to a lower position, in which position cone 4 becomes detached from cone 7a. At the same time, cone 7a, being slotted, becomes detached from bushing 6. At this juncture of the adjustment operation, bushing 6 may be rotated, this being effected by grasping the upper portion of the bushing with a suitable tool. While bushing 6 with attached form 5 is being rotated, cone 4 may be held against rotation, in present practice by two pins extending into the cone and also into slotted cone 7a.

After the parts have been rotated relative to each other sufficiently to effect the desired orientation of the respective worms, spindle 9 can be turned in the reverse direction whereby cone 4 will be pulled up into inner cone 7a. The latter being split will by consequence thereof spread and engage the bushing 6. Parts 4, 7a, and 6 now become interconnected to form a rigid unit. And if now the machine is operated it will have a different degree of filling in view of the effected adjustment.

It is, of course, to be understood that the present invention is, by no means, limited to the particular construction shown in the drawing but also comprises any modifications within the scope of the appended claims.

What we claim is:

1. In a feeding device for plastic masses adapted to be fed by a worm conveyor, especially plastic explosive materials, having a filling mandrel adapted to receive the container to be filled: a storage container adapted to receive the material to be fed into said filling mandrel, a first rotatable inner worm conveyor extending from said storage container into said filling mandrel, a second rotatable outer feeding worm conveyor coaxial with said filling worm conveyor and surrounding said filling worm conveyor in spaced relationship thereto, said inner and outer worm conveyors defining an annular space therebetween, said worm conveyors being rigidly interconnected to a common driving means during operation, and being disengageable and selectively adjustable relative to each other, during cessation of operation.

2. In a feeding device for plastic masses adapted to be fed by a worm conveyor, especially plastic explosive materials, having a filling mandrel adapted to receive the container to be filled: a storage container adapted to receive the material to be fed into said filling mandrel, a first rotatable inner worm conveyor extending from said storage container into said filling mandrel, a second rotatable outer feeding worm conveyor coaxial with said filling worm conveyor and surrounding said filling worm conveyor in spaced relationship thereto, said inner and outer worm conveyors defining an annular space therebetween, said worm conveyors being rigidly interconnected to a common driving means during operation, including clamping cone means connected to that end of said first conveyor which is remote from said filling mandrel, and being disengageable and selectively adjustable by rotatable spindle means rotatably engaging said clamping cone means.

3. In a feeding device for plastic masses adapted to be fed by a worm conveyor, especially plastic explosive materials, having a filling mandrel adapted to receive the container to be filled: a storage container adapted to receive the material to be fed into said filling mandrel, a first inner rotatable worm conveyor extending from said storage container into said filling mandrel, a second rotatable outer feeding worm conveyor coaxial with said filling worm conveyor and surrounding said filling worm conveyor in spaced relationship thereto, said inner and outer worm conveyors defining an annular space therebetween, said worm conveyors being rigidly interconnected to a common driving means during operation, including a hollow shaft adapted to be drivingly connected with a prime mover, a rotatable spindle extending through said hollow shaft, a cone-shaped clamping member connected to said spindle, said hollow shaft having that end thereof which is adjacent to said conveyors provided with an inner cone, and bushing means connected to said second worm conveyor and provided with a passage for selective engagement with said clamping member, said spindle being rotatable for pulling said cone-shaped clamping member into said inner cone for coupling said shaft with said first worm conveyor and through said bushing means with said second worm conveyor.

4. An arrangement according to claim 3, in which said inner cone is slotted.

References Cited in the file of this patent
UNITED STATES PATENTS

| | | |
|---|---|---|
| 1,452,585 | Adams | Apr. 24, 1923 |
| 2,279,640 | Ringmarck | Apr. 14, 1942 |